United States Patent [19]

Bitetti

[11] Patent Number: 4,811,603

[45] Date of Patent: Mar. 14, 1989

[54] TACHOMETRIC GENERATOR

[75] Inventor: Rodolfo Bitetti, Milan, Italy

[73] Assignee: Veglia Borletti S.r.l., Milan, Italy

[21] Appl. No.: 100,954

[22] Filed: Sep. 25, 1987

[30] Foreign Application Priority Data

Oct. 24, 1986 [IT] Italy .............................. 53995/86[U]

[51] Int. Cl.⁴ .............................................. G01P 1/04
[52] U.S. Cl. ....................................... 73/493; 73/494; 464/120
[58] Field of Search ......................... 73/493, 494, 518; 324/173, 174, 166; 74/12; 464/40, 57, 52, 53, 112, 120; 403/76, 122, 229, 372

[56] References Cited

U.S. PATENT DOCUMENTS 3,447,034  5/1969  Smith .................................... 73/493
3,472,045 10/1969  Nelsen et al. .......................... 464/52
3,505,879  4/1970  Vanderberg ........................... 73/493
3,911,237 10/1975  Naito et al. ........................... 73/493
4,246,790  1/1981  Nichols ................................. 73/493
4,646,042  2/1987  Eshelman ............................ 324/174

Primary Examiner—Stewart J. Levy
Assistant Examiner—Robert P. Bell
Attorney, Agent, or Firm—Albert L. Jeffers; Anthony Niewyk

[57] ABSTRACT

A tachometric generator comprises an input shaft which can be connected to a drive take-off from the vehicle, a main shaft connected to this input shaft by means of a ball joint resilient coupling torsionally coupled to an output shaft which can be connected to an external mechanical transmission. The speed of rotation of these shafts is detected by a magneto-electric sensor facing a magnetic disc fitted onto the output shaft.

7 Claims, 3 Drawing Sheets

TACHOMETRIC GENERATOR

BACKGROUND OF THE INVENTION

The present invention relates to a tachometric generator, particularly for measuring the speed of displacement of a movable vehicle.

Tachometric generators are known in which a shaft is connected to a drive take-off from the vehicle, and drives an element of ferro-magnetic material electromagnetically coupled to a sensor which detects its speed of rotation and generates electrical signals which when suitably processed by electronic circuits, are sent to indicator instruments disposed on the vehicle dashboard.

Known tachometric generators of the type briefly described have various disadvantages.

Vehicles are normally provided with a tachometer and an odometer; such instruments can be both of electric type, but more frequently the odometer is mechanical. Since tachometric generators do not normally include a mechanical output which can be connected, for example, by means of a flexible cable, to an input of the odometer, there is therefore required a further drive take-off and associated transmission separate from that of the tachometric generator.

Moreover, known tachometric generators include a shaft which is generally connected to the drive take-off by means of an intermediate spindle to which it is coupled prismatically. The prismatic coupling is formed with a large clearance between the parts of which it is composed in order to allow a slight relative oscillation between these shafts which compensates during operation for any possible axial misalignments or geometric errors. This results in a relative lack of precision in the transmission, with rapid wear, a risk of jamming or, in any case, with an incorrect kinematic functioning.

SUMMARY OF THE INVENTION

The object of the present invention is that of providing a tachometric generator which will be free from the disadvantages connected with the generators of known type described above.

The said object is achieved with the present invention in that it relates to a tachometric generator of the type comprising an outer body, at least one main shaft which can be connected to a drive take-off from a vehicle and to be put into rotation with an angular velocity proportional to the speed of displacement of the said vehicle, and transducer means for the generation of electrical signal which are variable according to a dual law of dependence on the said speed; characterised by the fact that it includes an output shaft housable in the said outer body and torsionally connectable to the said main shaft; the said output shaft being connectable with external mechanical transmission means.

BRIEF DESCRIPTION OF THE DRAWINGS

For a better understanding of the present invention two preferred embodiments are illustrated, by way of non-limitative example, with reference to the attached drawings, in which.

DETAILED DESCRIPTION OF THE INVENTION

Figure 1:
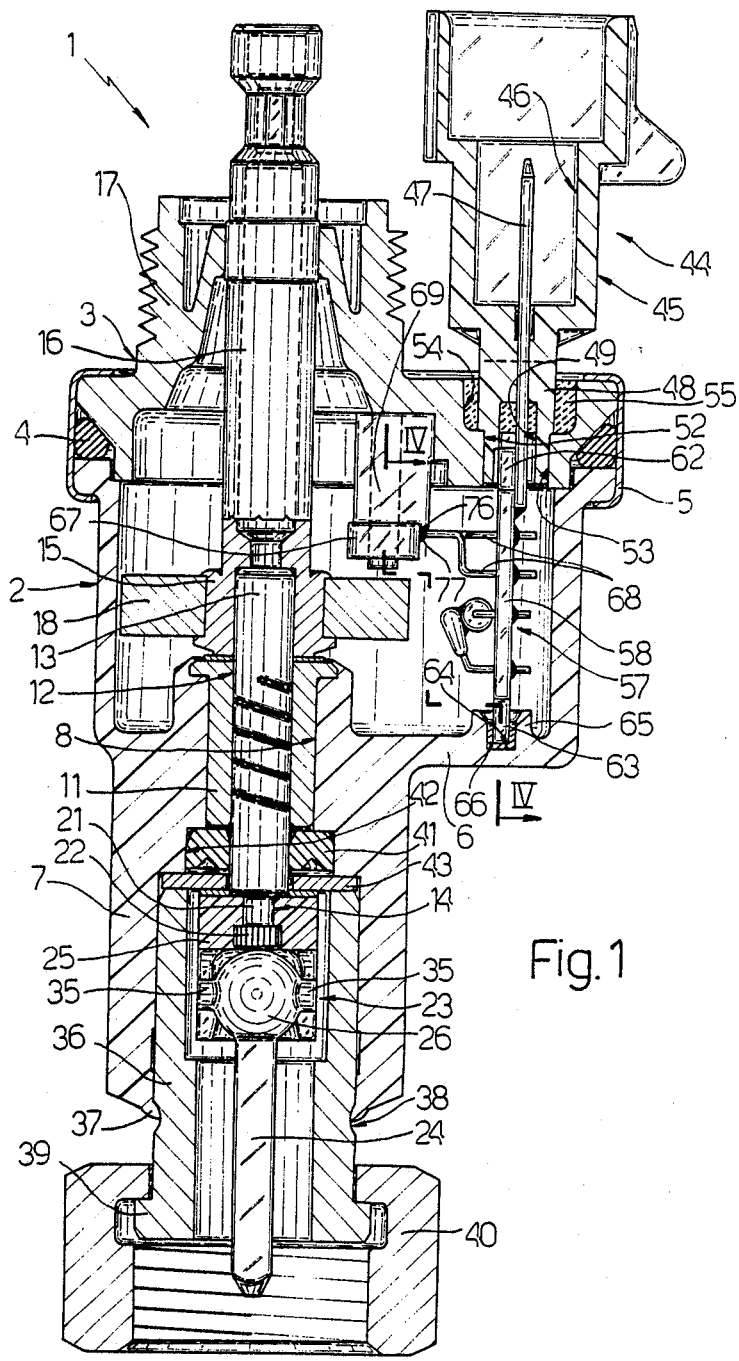
FIG. 1 is a sectional side view of a tachometric generator formed as a first embodiment of the present invention.

With particular reference to FIG. 1, a tachometric generator is generally indicated with the reference numeral 1, and has a hollow body 2 closed at the top by a cover 3, between which is interposed a sealing ring 4 of elastomeric material. In particular the seal 4 is sealingly thrust against the associated facing surfaces of the body 2 and the cover 3 by the action of an annular band 5 which grips opposite edges of the body 2 and of the cover 3.

From a base wall 6 of the body 2, and in an eccentric position with respect to an axis of symmetry of the body 2 itself, a tubular projection 7 extends downwardly. Within an axial duct 8 defined by adjacent portions of the tubular projections 7 and the wall 6 there is housed a self-lubricating bush 11 which radially supports a rotatable shaft 12, the opposite ends 13,14 of which extend, respectively, into the body 2 and the tubular projection 7.

The upper end 13 of the shaft 12 is torsionally coupled, for example by means of mechanical force, to a hub 15 constituting an end portion of a second, hollow, shaft 16 coaxial with the shaft 12, which extends within the body 2 and the cover 3, from which it projects upwardly through an externally threaded tubular projection 17 of the cover 3 itself. On the hub 15 is fitted a disc 18 of ferromagnetic material, magnetised in such a way as to have a plurality of equally angularly spaced radial poles.

Figure 3:
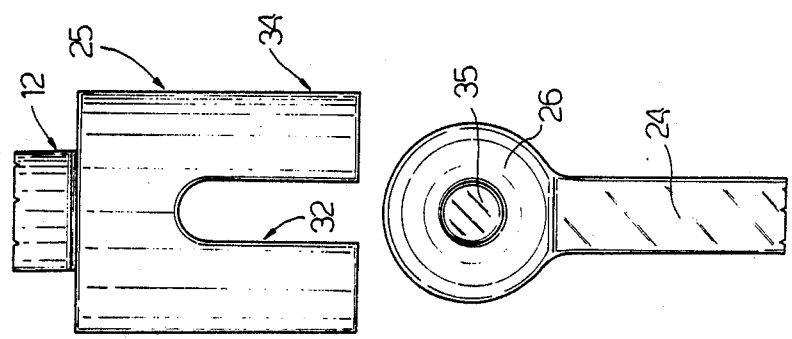
FIG. 3 is a partial side view, on an enlarged scale, of the detail of FIG. 2.
Figure 2:
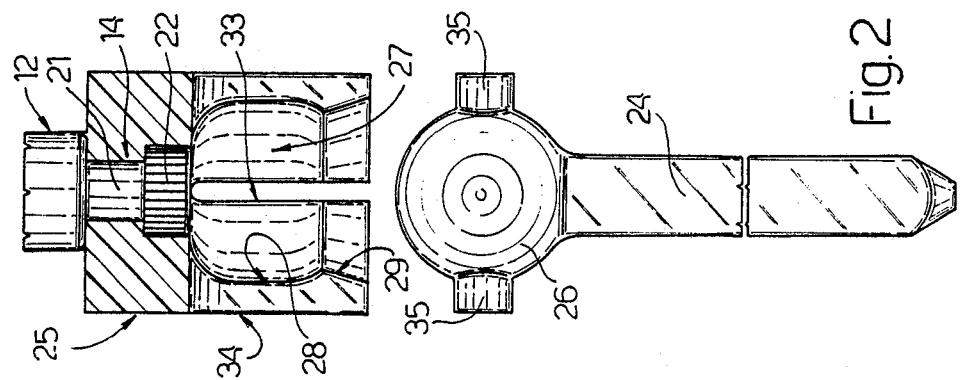
FIG. 2 illustrates a detail of FIG. 1 in partial section and on an enlarged scale with its elements shown separated.

The lower end 14 of the shaft 12 has a portion 21 of reduced diameter and a knurled end portion 22, and is torsionally coupled, by means of a coupling 23, to a square section spindle 24 connected, in use, to a drive take-off, not illustrated. The coupling 23 comprises a hollow element 25 fixed to the shaft 12 and conveniently moulded jointly with it in plastics material on the end 14 of the shaft 12 itself, and a ball element 26, integrally carried by the spindle 24 and housed in an angularly fixed manner within the hollow element 25. As is clearly visible in FIGS. 2 and 3, the substantially cylindrical element 25 has a cavity 27 which comprises an inner portion 28 having circular transverse sections and axial sections substantially in the form of a rectangle with widely rounded corners, and a frusto conical inlet portion 29 open downwardly and with a section which increases towards the outside. The element 25 further has two pairs of diametrically opposed slots 32,33 respectively of greater and lesser width, formed on the side wall 34 of the element 24 along planes which are orthogonal to one another and for a depth substantially equal to that of the cavity 27.

The ball element 26 has a diameter substantially equal to that of a median transverse section of the portion 28 of the cavity 27, and is provided with a pair of diametrically opposite cylindrical projections 35 disposed on a median plane orthogonal to the spindle 24. This ball element 26 is snap-engaged into the portion 28 of the cavity 27 through the inlet portion 28, causing a resilient radial deformation of the side walls 34, made possible by the said slots 32,33, in such a way that the cylindrical projections 35 occupy respective slots 32.

The ball joint 25 and the spindle 24 are protected by a bush 36 housed in the tubular projection 17 and retained in it by an inner terminal edge 37 of this latter, which is clenched into a corresponding external circumferential groove 38 of the bush 36. The bush 36 projects outwardly of the tubular projection 17 and terminates with a flange 39 which, in use, is connected to a corresponding terminal tubular element of the drive take-off, not illustrated, by means of a threaded ring nut 40.

A lip seal 41, lodged in a corresponding seat 42 at the lower end of the duct 8 and retained there by a ring 43 axially locked by the bush 36, prevents the possible infiltration of water into the interior of this duct 8 and therefore into the body 2 as well as the escape of lubricant from the bush 11.

An electrical connector 44 of conventional type comprises an outer body 45 provided with a cavity 46 which can receive an outer connector not illustrated and a set of three blade contacts 47 forced into a lower mount 48 of the said outer body; these contacts 47 project upwardly within the cavity 46 to cooperate, in use, with corresponding contacts of the said external connector, and project downwardly within a second cavity 49 internally of the mount 48. This mount 48 is inserted into a through hole of the cover 3, which has a lower portion 53 having a transverse section substantially equal to the transverse section of the mount 48 itself, and an upper portion 54 having a greater section and filled with a sealing material 55.

Figure 4:
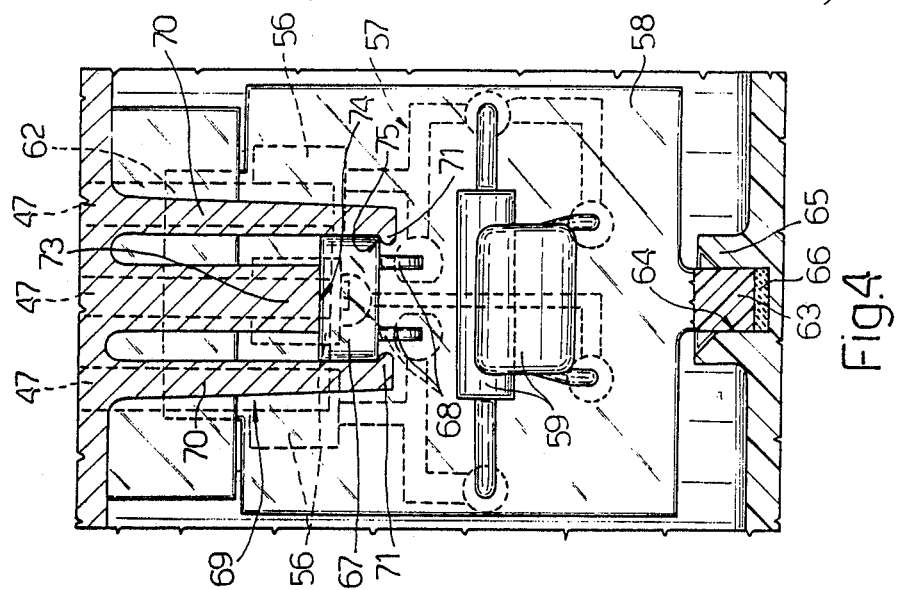
FIG. 4 is a partial section on an enlarged scale taken on the line IV—IV of FIG. 1.

The contacts 47 are soldered below to corresponding electrical terminals 56 (FIG. 4) of a printed circuit 57 of conventional type, disposed on the surface of a support base 58.

The base 58 is lodged in a vertical position within the body 2, with the components 59 facing inwardly of the body 2 itself; the base 58 (FIGS. 1 and 4) is fixed in this position by means of an upper tooth 62 which engages the cavity 49 of the connector 48, and a lower tooth 63, of smaller width, which engages a corresponding seat 64 of a projection 65 of the wall 6 and retained in it by adhesive 66.

A magneto-electric sensor 67 of the type generally known as a "Hall effect probe" is connected by means of its electrical terminals 68 to the printed circuit 57 and is housed in a support 69 which extends integrally downwardly from the cover 3 in a position such as to maintain the sensor 67 facing a peripheral portion of the disc 18. This support 69 comprises two lateral arms 70 disposed adjacent one another in a plane parallel to the base 58, and provided with respective end sections 71 bent over at 90° towards one another; and a shorter, central element 73 which terminates with a flat lower surface 74 which defines, with the said lateral arms 69, a seat 75 for the sensor 67. The positioning of the sensor 67 in a direction orthogonal to the base 58 is achieved by a stop tooth 76 on the surface 74 itself facing the base 58, against which the sensor engages and is fixed in place by means of a bead of adhesive 77.

Figure 5:
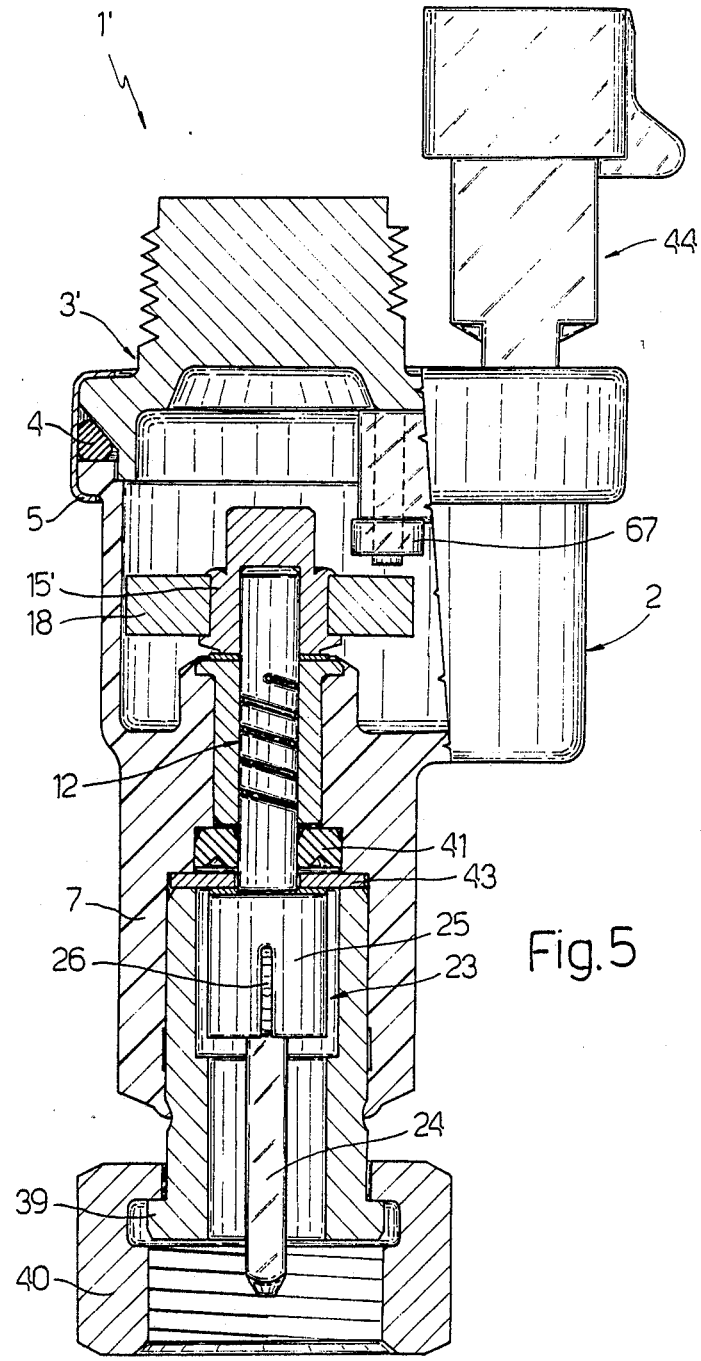
FIG. 5 is a sectional side view of a tachometric generator formed as a second embodiment of the present invention.

With reference to FIG. 5, a tachometric generator 1' is illustrated which differs from the generator 1 only by the fact that it does not have a mechanical output constituted by the shaft 16. Therefore, the shaft 12 only drives a hub 15', and the cover 3' is closed at the top.

The operation of the tachometric generator 1 is as follows.

The spindle 24 is connected in use to a drive take-off, for example on the gear box, which causes it to rotate with an angular velocity proportional to the speed of displacement of the vehicle itself.

The teeth 35 of the element 26, acting on the sides of the associated slots 32 of the element 25, drive the element 25 itself, which is fixed to the shaft 12 to which the shaft 16 is torsionally coupled by means of the hub 15. This shaft 16 therefore constitutes a mechanical output from the generator 1 and is connected in use to a transmission device (not illustrated) for example, to a flexible cable connected at an opposite end to an odometer.

The magneto-electric sensor 67 facing the periphery of the disc 18 driven to rotate by the hub 15, detects the variations in the magnetic field strength by the effect of the rotation of the disc 18 and converts them in a known manner into electrical signals which, suitably processed by the circuit 57, are sent via the contacts 47 of the connector 44 to an indicator instrument conveniently disposed on the vehicle dashboard (for example, a tachometer). In particular, since the number of poles of the disc 18 is fixed, the frequency of these variations is proportional to the speed of rotation of the shaft 12 and, therefore, to the speed of displacement of the vehicle.

The operation of the generator 1' is identical; the sole difference is constituted by the absence of the mechanical output.

From a study of the characteristics of tachometric generators formed according to the present invention the advantages which they allow to be obtained are evident. It is observed, in particular, that the generators 1 and 1' differ from one another exclusively by two components (shaft 16 and plug 3); therefore they can be formed equally well with only very modest variations during component production cycles and automatically assembled. This allows a considerable economy of scale in that the same generator, at least with the constructional variations described, can be mounted on vehicles provided with indicator instruments of the electrical type, mechanical type or both types (for example, electric tachometer and mechanical odometer).

Moreover, the connection between the spindle 24 and the shaft 12 is made with a resilient ball joint coupling 23 so as to compensate without force or risk of damage any possible angular error in the relative positioning of the two shafts, due, for example, to geometric errors in the connection to the drive take-off. Finally, it is clear that the tachometric generator 1 or 1' can have modifications or variations introduced thereto without by this departing from the protective ambit of the present invention.

I claim:

1. A tachometric generator of the type comprising at least one main shaft connectable to a drive take-off from a vehicle and driven to rotate with an angular velocity proportional to the speed of displacement of the said vehicle, and transducer means for the generation of electrical signals variable according to said speed, said generator comprising: an output shaft (16) housable in said outer body (2, 3) and torsionally connectable to said main shaft (12); said output shaft (16) being connectable to external mechanical transmission means, said main shaft (12) connected to said drive take-off by means of an input shaft (24) and torsionally coupled to said transducer means (18), said main shaft (12) and input shaft (24) being connected together by means of a ball joint coupling (23) which includes a ball element (26) fixed to said input shaft (24) and a hollow element (25) fixed to said main shaft (12), said ball element (26) including at least one radial projection (35) which engages a corresponding seat (32) of said hollow element (25) to provide torsional coupling between said input shaft (24) and said main shaft (12).

2. A generator according to claim 1, characterized by the fact that the said ball element (26) snap-engages into a cavity (27) of the said hollow element (25); the said hollow element (25) having at least one slot (32, 33) formed in a side wall (34) of the said cavity (27).

3. A generator according to claim 2, characterised by the fact that the said ball element (26) has two opposite cylindrical radial projections (35); the said corresponding seats for the said projections (35) being constituted by a pair of said slots (32).

4. A generator according to claim 1, characterised by the fact that the said hollow element (25) is made of plastics material and is moulded on an end portion (14) of the said main shaft (12).

5. A generator according to claim 1, characterised by the fact that the said transducer means (18, 67) include a disc (18) of ferromagnetic material having at least one pair of radial poles, and a magneto-electric sensor (67) facing one face of the said disc (18) in a peripheral position.

6. A generator according to claim 5, characterised by the fact that the said disc (18) is fitted onto a hub (15) torsionally coupled to the said main shaft (12).

7. A generator according to claim 6, characterised by the fact that the said hub (15) is an integral portion of the said output shaft (16).

* * * * *